United States Patent [19]

Murayama

[11] 4,244,232
[45] Jan. 13, 1981

[54] TRACTOR TRANSMISSION MECHANISM

[75] Inventor: Yoshinobu Murayama, Sakai, Japan

[73] Assignee: Kubota Ltd., Osaka, Japan

[21] Appl. No.: 899,089

[22] Filed: Apr. 24, 1978

[30] Foreign Application Priority Data

Sep. 20, 1977 [JP] Japan ................................. 52-113998

[51] Int. Cl.² ........................ F16H 37/00; F16H 57/02
[52] U.S. Cl. ................................. 74/15.66; 74/606 R
[58] Field of Search .................... 74/15.66, 15.84, 740, 74/606 R

[56] References Cited

U.S. PATENT DOCUMENTS

| | | | |
|---|---|---|---|
| 2,823,552 | 2/1958 | Haverlender | 74/606 R |
| 2,899,034 | 8/1959 | Hubert | 74/15.66 |
| 3,774,460 | 11/1973 | Browning et al. | 74/470 |

Primary Examiner—Kenneth Dorner
Attorney, Agent, or Firm—Wm. Jacquet Gribble

[57] ABSTRACT

A tractor transmission mechanism in which power ON/OFF operations of the travelling system and the PTO system may be carried out in succession by double action clutch means by utilizing a tractor transmission case of the type in which power ON/OFF operations of the travelling system and the PTO system are carried out at the same time by a main clutch.

2 Claims, 5 Drawing Figures

TRACTOR TRANSMISSION MECHANISM

BACKGROUND OF THE INVENTION

The present invention relates to a transmission mechanism for tractor in which power from the rotary drive shaft interlocking with the engine is transmitted, through double action clutch means, to the travelling system rotary shaft projecting from the transmission case and to the power take-off or PTO system rotary cylindrical shaft co-axially fitted on the external periphery of the projecting end of the travelling system rotary shaft.

As agricultural tractors, there is a first typed one in which power ON/OFF operations of the travelling system and the PTO system may be carried out at the same time by a main clutch, so that, when the tractor is stopped travelling, the PTO system is always stopped driving. There is a second typed tractor in which the interlocking mechanism for operation means is simplified and power ON/OFF operations of the travelling system and the PTO system may be carried out in succession by double action clutch means, thereby to readily carry out such an operation as preferentially stopping the travelling system or the PTO system prior to the other.

In forming a double action clutch typed tractor of the second type as described above, particular structural modification to be made to the transmission case is required for mounting double action clutch means. Namely, a single clutch typed tractor transmission case of the first type as described above may not be utilized for a double action clutch typed tractor transmission case. When intending to manufacture tractors of the both types as described above, transmission cases specifically designed for each typed tractor are therefore required. Two manufacturing lines each for each typed tractor are subsequently necessary, thus resulting in extended and expensive manufacturing facilities and increased costs.

SUMMARY OF THE INVENTION

In view of the foregoing, the present invention provides a transmission mechanism for which a single clutch typed tractor transmission case may be utilized for a double clutch typed tractor transmission case.

In double clutch means for an agricultural tractor, the present invention is characterized in that the PTO system rotary shaft projects from the transmission case and the geared transmission mechanism for the PTO system cylindrical shaft and the PTO system rotary shaft is disposed at the outside of the transmission case. Namely, a double action clutch typed tractor may be formed by utilizing a single clutch typed tractor transmission case shown in FIG. 5 as it is without preparing a specially designed transmission case for incorporating the geared transmission mechanism, because the PTO system cylindrical shaft and the PTO system rotary shaft are interlockingly connected to each other through the geared transmission mechanism at the outside of the transmission case whereby double action clutch means may be mounted.

As the result, it is not necessary to install a separate manufacturing line for manufacturing a transmission case particularly designed so as to mount double action clutch means, but it is possible to utilize the manufacturing line for manufacturing a transmission case in which a single clutch means is mounted, whereby efficient and economical productivity may be obtained.

It is a main object of the present invention to provide a transmission mechanism for which double action clutch typed tractor may be formed by utilizing a single clutch typed tractor transmission case as it is, thereby to advantageously prevent the costs from increasing.

It is another object of the present invention to simplify a mechanism for mounting an operation member for operating the travelling system clutch and the PTO system clutch in association with operating means.

Other objects and advantages of the present invention will be apparent from the following detailed description.

BRIEF DESCRIPTION OF THE DRAWINGS

An embodiment of the present invention will now be described when taken in conjunction with the accompanying drawings wherein.

DESCRIPTION OF A PREFERRED EMBODIMENT

Figure 1:
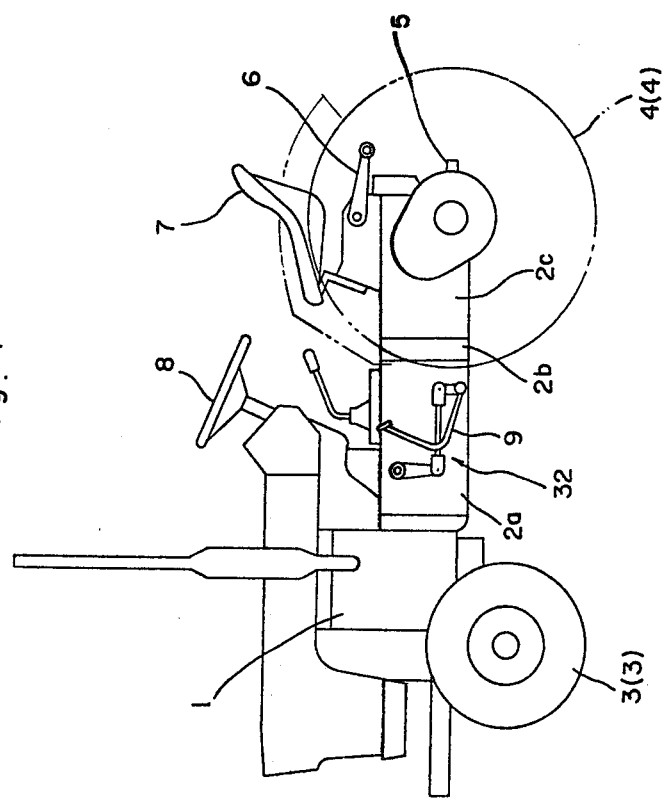
FIG. 1 is a sectional view of an agricultural tractor.

Referring to FIG. 1, an agricultural tractor has an engine 1, transmission cases 2a, 2b and 2c connected to each other in this order and forming a tractor body frame, front wheels 3 for travelling, rear wheels 4 to be driven as described later, a PTO shaft 5 for driving an attachment, a lift arm member 6 for lifting and lowering the attachment, an operator seat 7, a control wheel 8, and a foot pedal 9 for operating a travelling system clutch 10 and a PTO system clutch 11 as described later.

Figure 2:
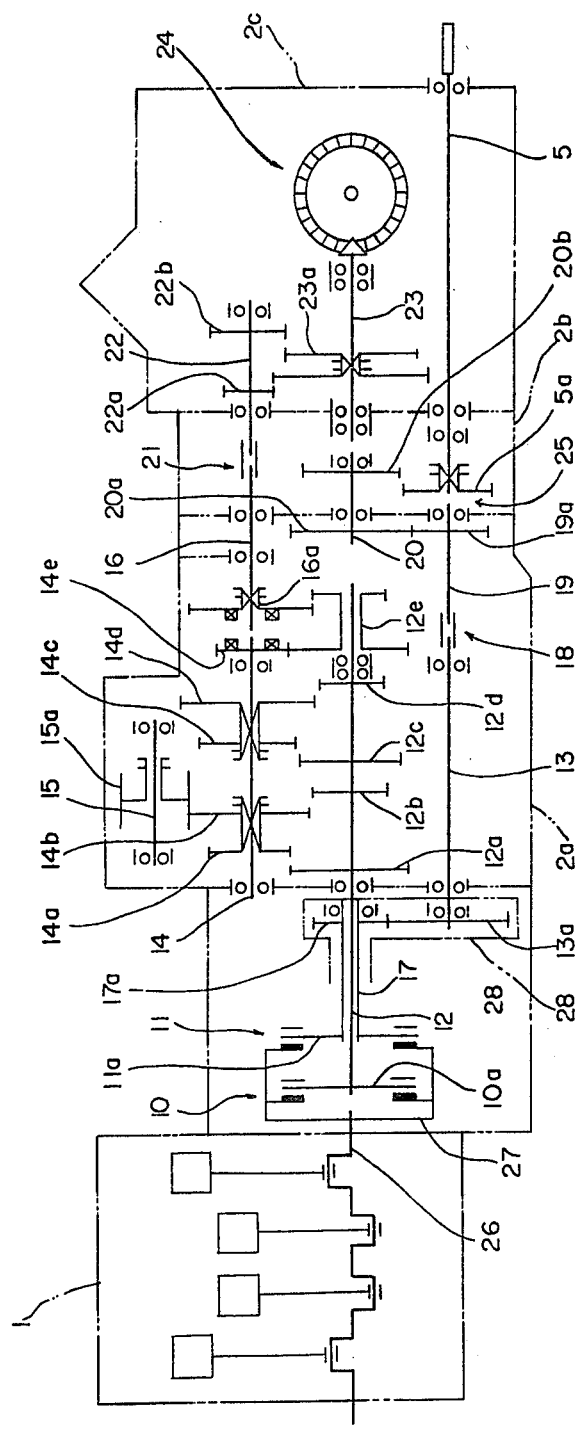
FIG. 2 is a schematical diagram of a transmission mechanism in accordance with the present invention.
Figure 3:
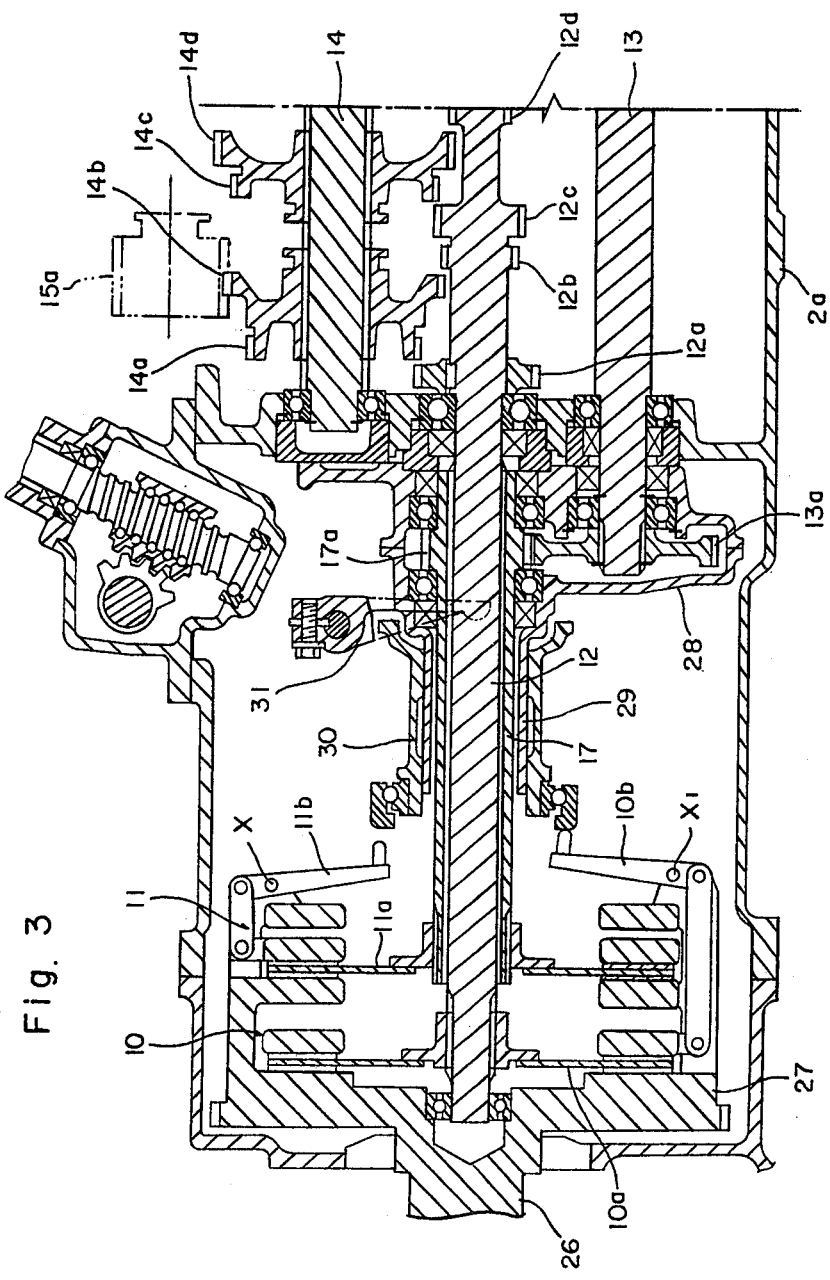
FIG. 3 is a vertical sectional view showing the mounting portion of double clutch means in the transmission mechanism of FIG. 2.
Figure 4:
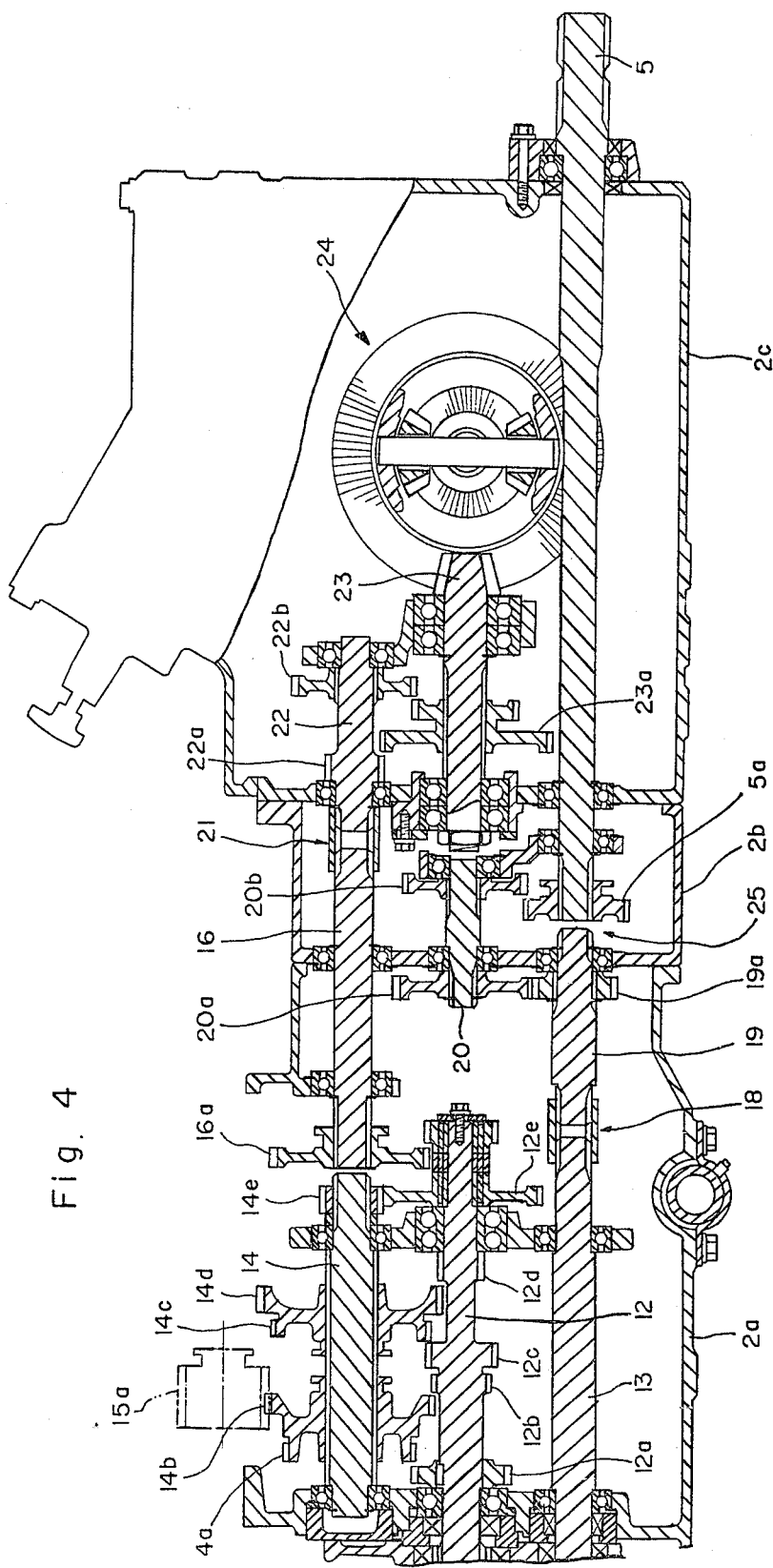
FIG. 4 is a vertical sectional view showing the power transmission mechanism from the travelling system rotary shaft and the PTO system rotary shaft to the differential means for rear wheels and the PTO shaft.

Referring now to FIGS. 2, 3 and 4, description will be made of the transmission mechanism for the rear wheels 4 and the PTO shaft 5.

Among the transmission cases 2a, 2b and 2c, the first transmission case 2a is disposed at the most front part of the tractor body frame. Disposed in this transmission case 2a are a travelling system input rotary shaft 12, a PTO system input rotary shaft 13, a first travelling system transmission shaft 14 and a backward transmission shaft 15, these four shafts being in parallel with each other and disposed also in parallel with the front-rear direction axis of the tractor car body.

Journalled in the first transmission case 2a is a second travelling system transmission shaft 16 co-axially disposed in the end-abutting manner at the rear end of the first transmission shaft 15.

The front ends of the travelling system input shaft 12 and the PTO system input shaft 13 project forwardly from the front wall of the first transmission case 2a. A rotary cylindrical shaft 17 is rotatably fitted on and co-axially disposed with the travelling system input shaft 12.

Journalled in the second transmission case 2b located between the first transmission case 2a and the third transmission case 2c are a transmission shaft 19 disposed in the end-abutting manner co-axially with and interlockingly connected to the rear end of the PTO system input shaft 13 through a joint 18, a PTO system transmission shaft 20 interlockingly connected to the transmission shaft 19, the PTO shaft 5 co-axially disposed in the end-abutting manner at the rear end of the transmission shaft 19, and the rear end of a second transmission shaft 16.

Supported in the third transmission case 2c located at the most rear part among three transmission cases 2a, 2b and 2c are a speed change transmission shaft 22 disposed in the end-abutting manner co-axially with and interlockingly connected to the rear end of the second transmission shaft 16 through a joint 21, an output shaft 23 adapted to be interlockingly connected to the transmission shaft 22, and a differential gearing 24 adapted to be interlocked with the output shaft 23. In addition, the PTO shaft 5 passes through the third transmission case 2c.

A first shift gear comprising in a unitary construction toothed wheels 14a and 14b and a second shift gear comprising in a unitary construction toothed wheels 14c and 14d are splined and disposed on the first travelling system transmission shaft 14 so as to be movable axially thereof, and a transmission toothed wheel 14e is fixed to the first travelling system transmission shaft 14.

Fixed on the input shaft 12 are a toothed wheel 12a engageable with the toothed wheel 14a, a toothed wheel 12b engageable with the toothed wheel 14b, a toothed wheel 12c engageable with the toothed wheel 14c, and a toothed wheel 12d engageable with the toothed wheel 14d.

In addition, a unitary gear 12e is rotatably disposed on the input shaft 12, said unitary gear 12e comprising in a unitary construction a toothed wheel always engaged with the transmission toothed wheel 14e and a toothed wheel engageable with a shift toothed wheel 16a to be described later.

A backward toothed wheel 15a is disposed on the backward transmission shaft 15 so as to be movable axially thereof, said backward toothed wheel 15a being always engaged with the toothed wheel 14c and, upon axial movement thereof, engageable with the shift toothed wheel 14b.

The shift toothed wheel 16a mentioned earlier is splined and disposed on the second transmission shaft 16 so as to be movable axially thereof, said shift toothed wheel 16a adapted to be interlockingly connected to the transmission toothed wheel 14e through a clutch. Two toothed wheels 22a and 22b are securely fixed to the speed change transmission shaft 22. A shift gear 23a is splined and disposed on the output shaft 23 so as to be movable axially thereof, said shift gear 23a comprising in a unitary construction a toothed wheel engageable with the toothed wheel 22b.

The present invention is so constructed that forward 16-stage and backward 4-stage speed changes may be provided by slidably operating each of the shift toothed wheels 14a, 14b and 16a . . . . Namely, forward 4-stage speed change is provided by the sliding operation of the first shift gear comprising toothed wheels 14a and 14b and the second shift gear comprising toothed wheels 14c and 14d. This 4-stage speed change may be doubled to 8-stage by the sliding operation of the shift toothed wheel 16a, and thus doubled 8-stage speed change may further be doubled to 16-stage by the sliding operation of the shift toothed wheel 23a. On the other hand, backward travelling to be provided by the sliding operation of the shift toothed wheel 15a, may be provided in the 4-stage speed change by the sliding operation of the shift toothed wheel 16a and 23a.

The transmission shaft 19 is provided with a toothed wheel 19a always engaged with a toothed wheel 20a fixed to the transmission shaft 20, and the transmission shaft 20 is provided with a toothed wheel 20b different from the toothed wheel 20a. A shift toothed wheel 5a engageable with the toothed wheel 20b is splined and disposed on the PTO shaft 5 so as to be movable axially thereof, said shift toothed wheel 5a constructed so as to be engageable with the transmission shaft 19, thus forming an interlocking clutch means 25 between the transmission shaft 19 and the PTO shaft 5. The PTO shaft 5 is so constructed that power may be transmitted thereto in the 2-stage speed change by the sliding operation of the shift toothed wheel 5a.

A geared transmission mechanism is constituted by engagement of a toothed wheel 13a with a toothed wheel 17a, said toothed wheel 13a being securely fixed to that portion of the PTO system input shaft 13 which projects from the front wall of the first transmission case 2a and said toothed wheel 17a being securely fixed to that portion of the cylindrical shaft 17 which projects from the front wall of the first transmission case 2a. The travelling system clutch 10 is provided between the travelling system input shaft 12 and the engine output shaft 26, and the PTO system clutch 11 is provided between the cylindrical shaft 17 and the engine output shaft 26. These clutches 10 and 11 are formed by press-contacting clutch plates 10a and 11a with a flywheel 27 fixed to the engine output shaft 26, said clutch plates 10a and 11a being splined and disposed on the input shaft 12 and the cylindrical shaft 17, respectively, so as to be movable axially thereof. The clutch plates 10a and 11a are spring-loaded toward the flywheel 27, namely the clutch plates 10a and 11a are constructed so as to be normally connected by loaded-spring action, and adapted to be disconnected when clutch operating arms 10b and 11b pivotally connected to the flywheel 27 are axially pressed and swung around $X_1$ and $X_2$.

The geared transmission mechanism is sealingly covered by an auxiliary gear case 28, in which lubricant oil is stored. That portion of the auxiliary case 28 which fits on the external periphery of the cylindrical shaft 17, axially extends along the cylindrical shaft 17 in the direction away from the front wall of the transmission case 2a. A sleeve 29 is thus constructed integrally with the auxiliary case 28 at the extended portion thereof. A cylindrical bracket 30 adapted to contact with the clutch operating arms 10b and 11b, is fitted on the external periphery of the sleeve 29 so as to be axially slidable, the sleeve 29 also serving as a mounting portion of the bracket 30.

The clutches 10 and 11 are so constructed that the travelling clutch 10 is first disconnected by the first pressing of the pedal 9 and the PTO clutch 11 is then disconnected by the second pressing of the pedal 9, the detail of this operation being described in the following.

A shift fork 31 is interlockingly connected to the bracket 30, and also interlockingly connected to the pedal 9 through a link mechanism 32. The distance between the bracket 30 and the travelling system clutch operating arm 10b is provided smaller than the distance between the bracket 30 and the PTO system clutch operating arm 11b. Accordingly, when the pedal 9 is pressed, the bracket 30 is slidably moved so that the operating arm 10b is first swung, thus disconnecting the travelling clutch 10, and the operating arm 11b is then swung, thus disconnecting the PTO clutch 11.

It would be therefore noted that the present embodiment described hereinbefore is so constructed that the travelling clutch 10 is preferentially disconnected prior to the PTO clutch 11. Namely, when a tractor is operated with, for example, a rotary cultivator interlockingly connected to the PTO shaft of the tractor and the cultivator bites the ground so that the tractor travels with difficulty, it is possible to temporarily stop the travelling of the tractor and to drive only the cultivator so as to remove the soil from the cultivator. Thus, the tractor may be travelled in an easier manner with the cultivator lifted.

However, the distance between the bracket 30 and the PTO system clutch operating arm 11b may be provided smaller than the distance between the bracket 30 and the travelling system clutch operating arm 10b, so that the PTO system clutch 11 is preferentially disconnected prior to the travelling system clutch 10. In such an arrangement, when a tractor is operated with, for example, a mower interlockingly connected to the PTO shaft 5 of the tractor and trees accidentally located within the working area might be damaged if the tractor travels with the mower driven, it may be possible to pass through the places adjacent such trees with the mower temporalily stopped driving, so as to restrain the damages to the trees.

Figure 5:
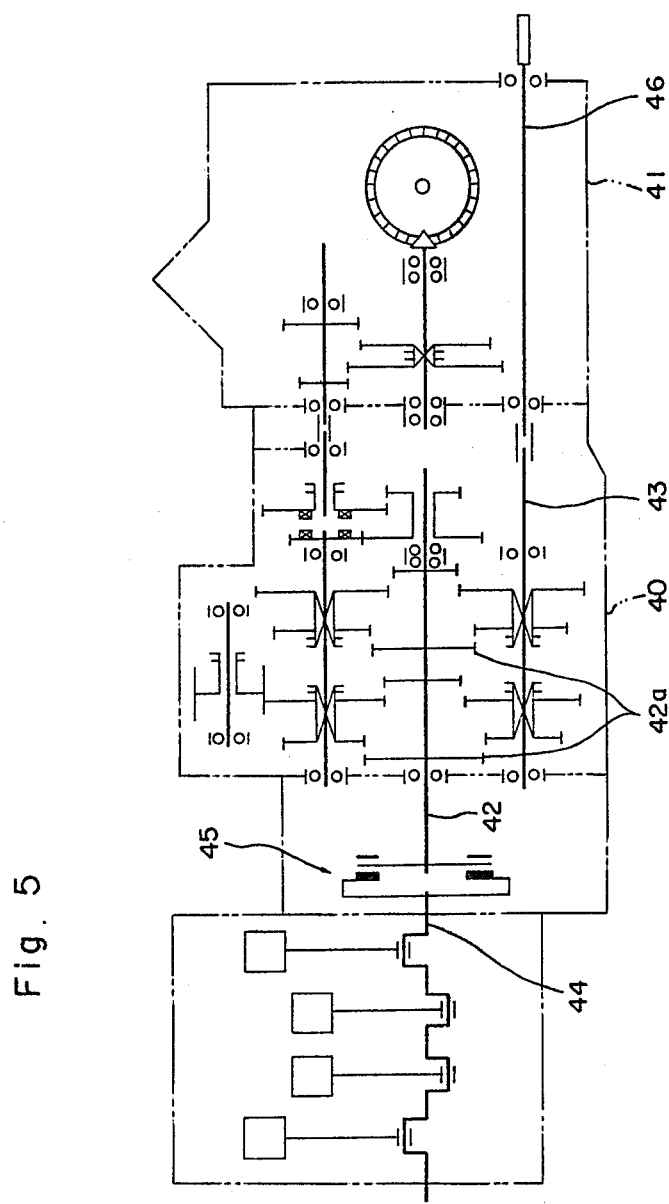
FIG. 5 is a schematical diagram of a transmission mechanism in an agricultural tractor of the single clutch type.

Referring now to FIG. 5, description will be made of the single clutch typed tractor transmission case.

The transmission case comprises a first transmission case 40 and a second transmission case 41. The transmission mechanism thereof is so constructed that power from toothed wheels 42a . . . fixed to a travelling system input shaft 42 is transmitted to a PTO system input shaft 43 in the first transmission case 40 and that a travelling shaft and a PTO shaft 46 may be stopped driving at the same time by off-operation of a main clutch 45 disposed between the travelling system input shaft 42 and an engine output shaft 44. As apparent from the comparison of this typed tractor with the tractor in the embodiment of the present invention described earlier, the first transmission case 40 and the second transmission case 41 are constructed in the same manner as the first transmission case 2a and the third transmission case 2c, respectively, with respect to drilling work for shaft insertion. In forming a double clutch typed tractor, it is therefore possible to utilize the first transmission case 40 as its first transmission case 2a and the second transmission case 41 as its third transmission case 2c.

What I claim is:

1. A tractor transmission mechanism having a transmission case, an engine output shaft connected to an engine, double action clutch means connected to the engine output shaft and including a travelling system clutch and a power take-off system clutch, a travelling system input rotary shaft projecting through a wall of the transmission case and connected to the travelling system clutch, a rotary cylindrical shaft co-axially fitted on a part of the travelling system input shaft projecting through the wall of the transmission case, said transmission mechanism comprising;
    an auxiliary gear case fitted on the external periphery of the rotary cylindrical shaft and on the external surface of the wall of the transmission case,
    a power take-off system input rotary shaft disposed beneath the travelling system input rotary shaft, one end of said input rotary shaft being extended through the wall of the transmission case into the auxiliary gear case,
    a toothed wheel mounted on the rotary cylindrical shaft and disposed in the auxiliary gear case, and
    a further toothed wheel mounted on the extended end of the power take-off system input rotary shaft in the auxiliary gear case, said wheels being engaged with each other.

2. A transmission mechanism as set forth in claim 1, in which said auxiliary gear case comprises a sleeve, a cylindrical bracket adapted to make contact with clutch operating arms of said double action clutch means, said cylindrical bracket being supported by said sleeve, and a shift fork interlockingly connected to said cylindrical bracket.

* * * * *